US007853450B2

(12) United States Patent
Kadel

(10) Patent No.: US 7,853,450 B2
(45) Date of Patent: Dec. 14, 2010

(54) DIGITAL VOICE ENHANCEMENT

(75) Inventor: Bryan Kadel, Carol Stream, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 892 days.

(21) Appl. No.: 11/731,573

(22) Filed: Mar. 30, 2007

(65) Prior Publication Data

US 2008/0243277 A1 Oct. 2, 2008

(51) Int. Cl.
*G10L 15/04* (2006.01)

(52) U.S. Cl. ........................ 704/254; 704/249; 704/250

(58) Field of Classification Search ................. 704/208, 704/267, 219, 210, 227, 214, 221, 223, 254, 704/251, 252, 253, 248, 249, 500, 501
See application file for complete search history.

(56) References Cited

U.S. PATENT DOCUMENTS 7,117,156 B1 * 10/2006 Kapilow ..................... 704/267
7,596,489 B2 * 9/2009 Kovesi et al. ............... 704/219
7,657,427 B2 * 2/2010 Jelinek ....................... 704/208

* cited by examiner

*Primary Examiner*—Huyen X. Vo
(74) *Attorney, Agent, or Firm*—Carmen Patti Law Group, LLC

(57) ABSTRACT

A method of transmitting digital voice information comprises encoding raw speech into encoded digital speech data. The beginning and end of individual phonemes within the encoded digital speech data are marked. The encoded digital speech data is formed into packets. The packets are fed into a speech decoding mechanism.

20 Claims, 5 Drawing Sheets

DIGITAL VOICE ENHANCEMENT

BACKGROUND

This application is directed generally to digitally encoded speech and in particular to enhancing the quality of digitally encoded speech transmitted over media susceptible to packet loss.

The use of digital systems to transmit human speech has become commonplace. Wireless telephony, VOIP, CDMA, GSM, WiFi, and ethernet are just a few examples of such applications. Typically, speech in analog form is converted into digital data, i.e. digitally encoded, at its source by a digital encoder. The digitally encoded speech is then divided into manageable data groups, or "packets" for transmission over a communications medium.

Unfortunately, known communications media often experience "packet loss", in which data groups are lost during transmission. Packet Loss can occur for a variety of reasons including link failure, high levels of congestion that lead to buffer overflow in routers, Random Early Detection (RED), Ethernet problems, and the occasional misrouted packet. The missing data occurring as a result of packet loss can produce pops, random noise, or silence at the receiving end. In such instances, the end user of the system receives garbled, often unintelligible speech.

Packet Loss Concealment ("PLC") is a technique used to mask the effects of missing sound data due to lost or discarded packets. PLC is generally effective only for small numbers of consecutive lost packets, for example a total of 20-30 milliseconds of speech, and for low packet loss rates. Packet loss can be bursty in nature—with periods of several seconds during which packet loss may be 20-30 percent. The average packet loss rate for a sound transmission session may be low. However, even short periods of high loss rate can cause noticeable degradation in the quality of transmitted sound. PLC algorithms can be implemented simply by inserting silence or "white noise" in place of missing packets. Other PLC algorithms involve either replaying the last packet received ("replay") or some more sophisticated algorithm that uses previous speech samples to generate speech. Simple replay algorithms tend to lead to "robotic" sounding speech when multiple consecutive packets are lost. More sophisticated algorithms can provide reasonable quality at 20% packet loss rates. Unfortunately, sophisticated algorithms can consume DSP bandwidth and hence reduce the number of channels that can be supported in, for example, a high density gateway.

Turning next to speech itself, linguists classify the speech sounds used in a language into a number of abstract categories called phonemes. American English, for example, has about 41 phonemes, although the number varies according to the dialect of the speaker and the system employed by the linguist doing the classification. Phonemes are abstract categories which allow us to group together subsets of speech sounds. Even though no two speech sounds, or phones, are identical, all of the phones classified into one phoneme category are similar enough so that they convey the same meaning. The phoneme can be defined as "the smallest meaningful psychological unit of sound." The phoneme has mental, physiological, and physical substance: our brains process the sounds; the sounds are produced by the human speech organs; and the sounds are physical entities that can be recorded and measured.

SUMMARY

In one implementation, a method of transmitting digital voice information includes encoding raw speech into encoded digital speech data. The beginning and end of individual phonemes within the encoded digital speech data are marked. The encoded digital speech data is formed into packets. The packets are fed into a speech decoding mechanism.

In another implementation, a method of manipulating digital voice information begins with inputting raw speech into a phonetic detector, which is then actuated to mark predetermined units of speech within the raw speech. The raw speech is then encoded into encoded digital speech data while retaining the marked units of speech. The encoded digital speech data is then formed into packets.

Yet another implementation involves transmitting digital voice information by first inputting raw speech into a phonetic detector. The phonetic detector is then actuated to mark individual phonemes within the raw speech. The raw speech is encoded into encoded digital speech data while retaining the marked phonemes, and the encoded digital speech data is formed into packets. Next, the packets are transmitted to a speech decoding mechanism, where the packets are reassembled. Any missing packets are detected at the speech decoding mechanism, and an alternative audio signal is substituted for any missing packets. The reassembled packets and substituted audio signals are sent into a speech generator, where raw speech output is generated.

DETAILED DESCRIPTION

Figure 1:
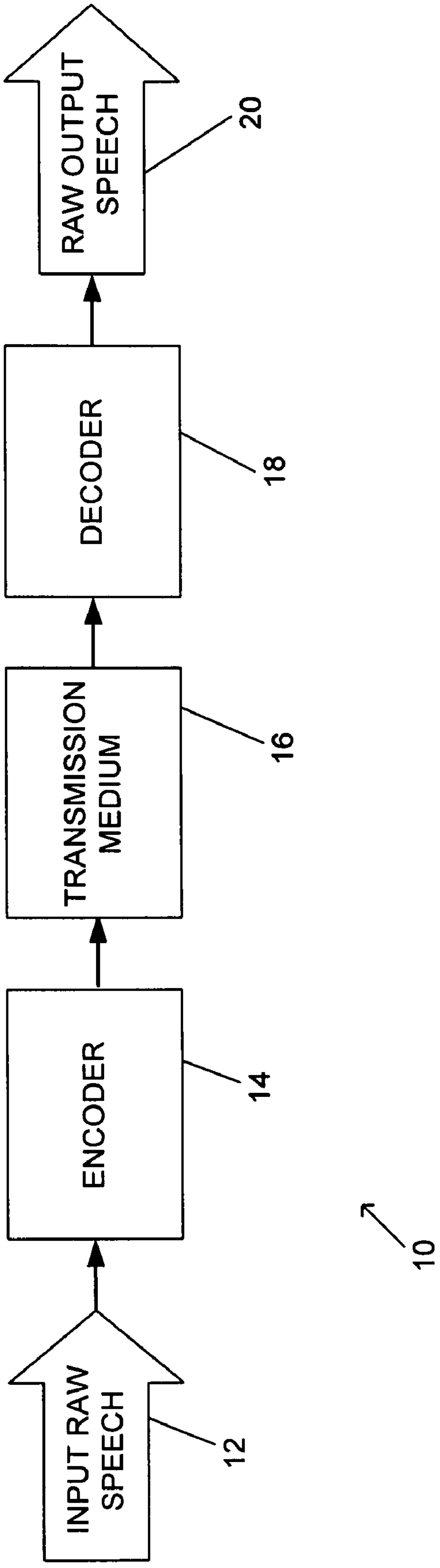
FIG. 1 illustrates a representation of one implementation of an apparatus that comprises a digital voice transmission system.

FIG. 1 illustrates a schematic diagram of a digital voice transmission system 10. The system 10 comprises an input section 12 representing an input stage at which raw speech is input into the system 10. The raw speech may be input by any suitable method, such as spoken word input via a microphone. The speech is sent from the input section 12 to an encoder 14, where it is encoded into digital speech data and arranged into packets for transmission. A transmission medium 16 is then used to transmit the encoded speech data.

Figure 2:
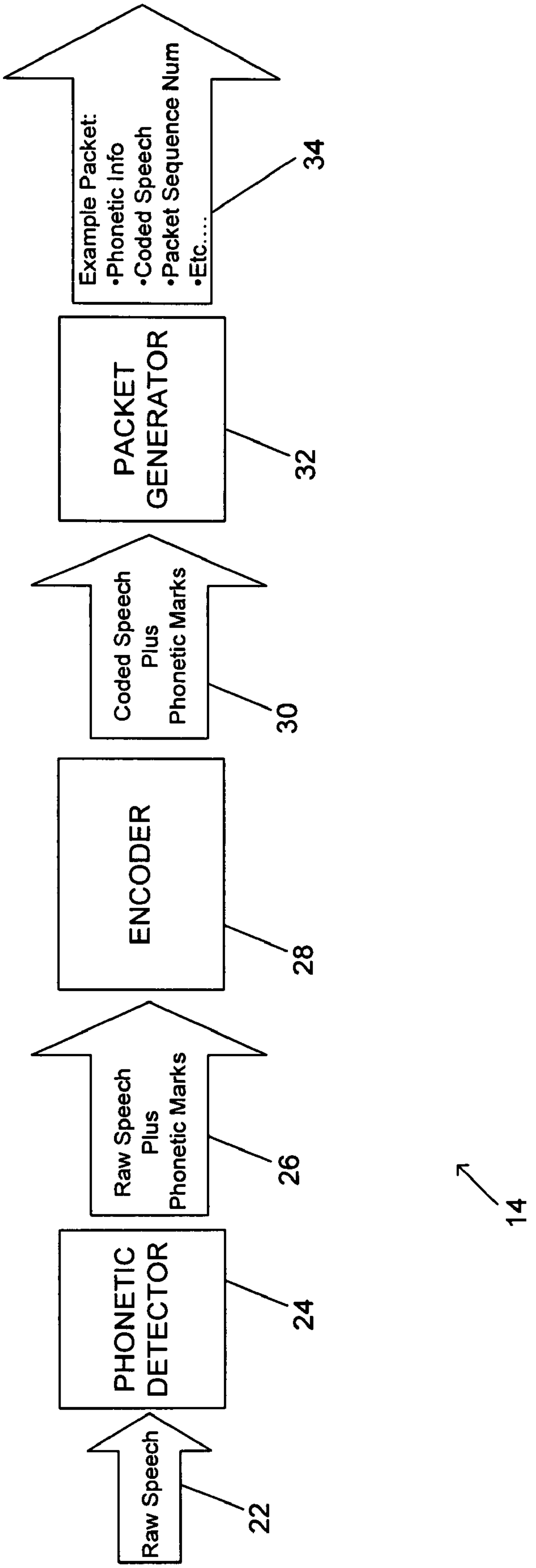
FIG. 2 illustrates a representation of an encoder of the apparatus of FIG. 1.
Figure 3:
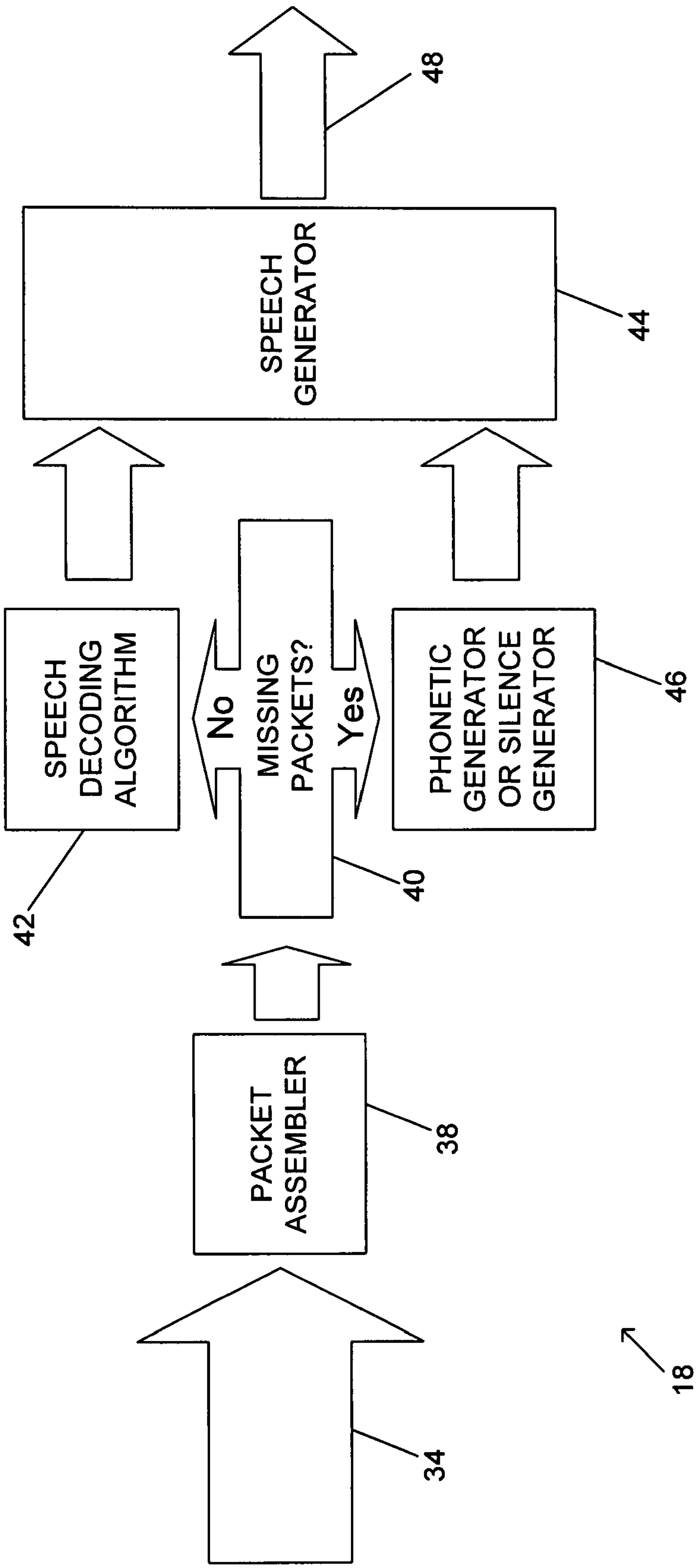
FIG. 3 illustrates a representation of a decoder of the apparatus of FIG. 1.

The transmission medium 16 can be provided in any suitable form, such as Wireless telephony, VOIP, CDMA, GSM, and WiFi. The encoded speech data is received at a decoder 18, at which the encoded speech data is reassembled and put into suitable form to be played as raw speech data at an output mechanism 20. Details of the encoding mechanism are shown in FIG. 2. Raw speech 22 is input into a phonetic detector 24. The phonetic detector 24 accepts raw speech as input, and adds phonetic marks. The phonetic marks may comprise phonetic data such as a start of a phoneme, a phoneme number that indicates a phoneme type, or an end of a phoneme. These marks allow later stages, for example, the coder 32, to group coded speech and comprise the relevant phonetic information. The term "phonemes" is considered to apply to recognized phonemes, tri-phones, or any distinguishable simple sounds that humans are able to produce as part of their vocal track.

Output 26 of the phonetic detector 24 comprises the raw speech plus the phonetic marks from the phonetic detector 24. The output 26 is passed as marked speech data to an encoder 28. The encoder 28 may comprise any suitable speech coding algorithm, depending upon the language, transmission medium, or other factors known to those of skill in the art. The encoder 28 accepts the speech with the marks applied at the phonetic detector 24, and encodes the marked speech data in such a manner as to permit the marks to remain intact through the encoding process. The encoder 28 in one example groups data in an output stream 30 such that it represents the placement of that speech in the stream. The encoder 28 sends the output stream 30 to a packet generator 32.

At the packet generator 32, data packets are formatted and generated for transmission from the output stream 30. The encoded and marked speech data is organized into frame sizes required for the specific transmission medium, or based on the QOS requirements. For example, each packet may comprise the frame size (if variable frame sizes are used), a sequence number for the packet and/or frame, the coded speech itself, the phonetic information as marked including any current phonetic data, the previous "end of phoneme data" (used by decoder to re-construct lost frames). If the phoneme is sufficiently small, it may be contained within a single frame in which case the packet generator 32 will only send an "end of phoneme" mark. The packets 34 are then sent along a transmission medium 16 to the decoder 18. In one example, the packets are formatted such that a phoneme does not span multiple packets.

The decoder 18 receives the packets 34 and reassembles the packets in proper order and in real time at a packet assembler 38. The packet assembler 38 re-aligns or groups the packets 34 into proper frame sizes, and handles jitter requirements based, for example, on application or QOS information. A packet detector 40 detects missing packets based on sequence number and a jitter timer, and looks ahead in packet buffers to locate any that contain previous phonetic data. The packet detector 40 then inserts a special frame for any missing packet, and identifies the special frame as a missing packet. If a normally coded speech frame is received, the packet is simply passed to the speech decoding algorithm 42, and then to a speech generator 44. The speech decoding algorithm 42 functions opposite to the encoding algorithm 28. If a special "missing packet" frame is identified, the packet is passed to a phonetic generator 46. The phonetic generator 46 accepts the coded speech and phonetic marks as input, and produces raw speech output. However, the raw speech output is still maintained in a framed grouping. The speech decoding algorithm 42 passes phonetic data, for example, the phonemes, as part of its output. This information will be used with the output of the phonetic generator 46 to blend synthesized output with decoded speech when packets are lost.

The phonetic generator 46 processes packets that contain "previous phonetic data" by generating missing frame data based on phonetic data. The generator 46 determines whether the entire phoneme was lost, or only part of the phoneme. The generator has the ability to access information in the speech output queue (or previous speech output) which is maintained by the speech generator. This information is used to blend the generated frame with the previous frame.

Figure 4:
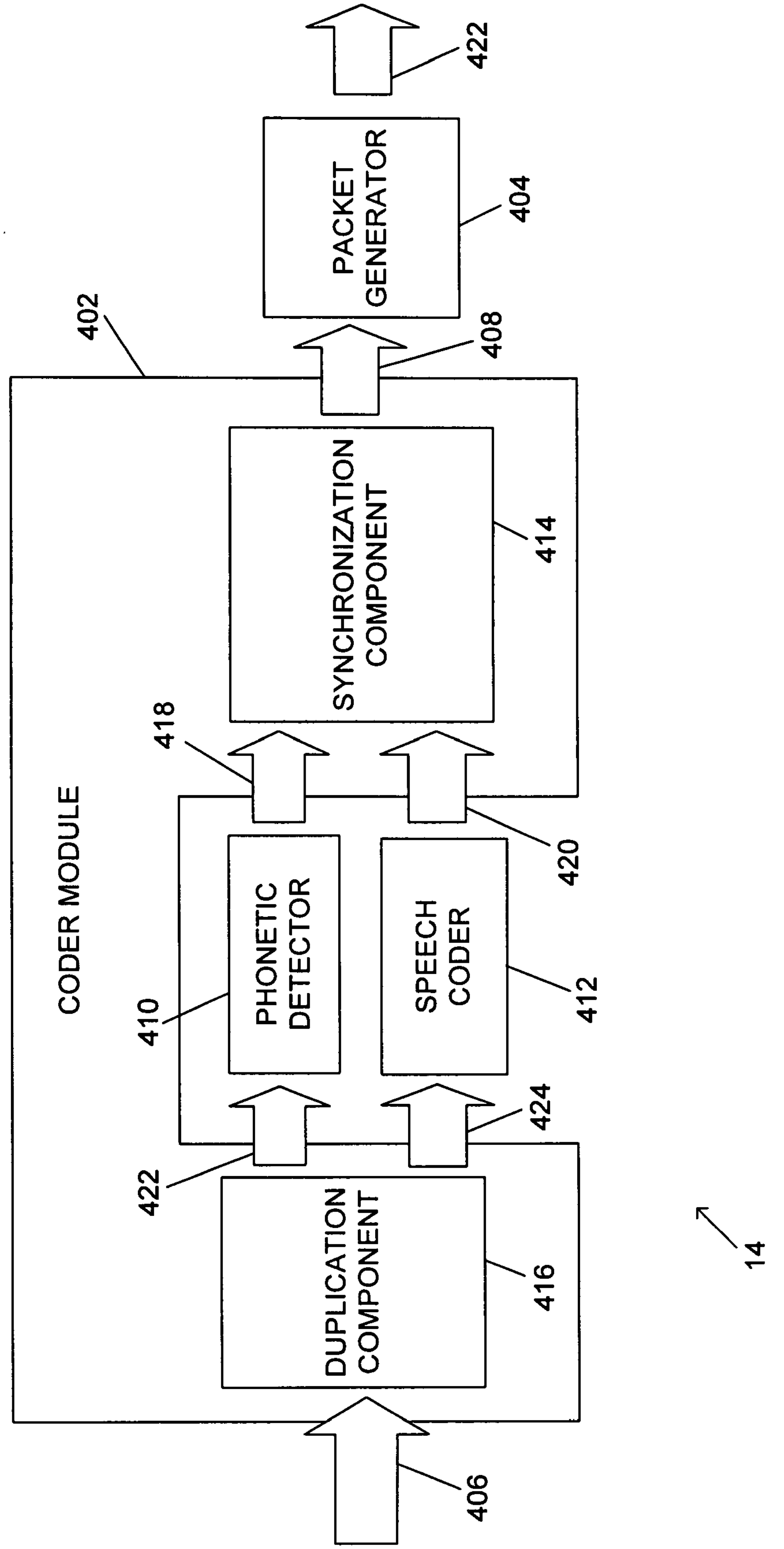
FIG. 4 illustrates a representation of another implementation of the encoder of the apparatus of FIG. 1.

Turning to FIG. 4, another implementation of the encoder 14 is shown. In this implementation, the encoder 14 comprises a coder module 402 and a packet module 404. The coder module 402 receives raw speech 406 and provides an output 408 that comprises coded speech and phonetic marks. The coder module 402 in one example comprises a phonetic detector 410, a speech coder 412, and a synchronization component 414. In a further example, the coder module 402 comprises a duplication component 416.

The phonetic detector 410 in one example receives raw speech and outputs phonetic marks 418 that correspond to the raw speech. The phonetic detector 410 in one example employs a phonetic speech recognition engine to identify a start and an end of an individual phoneme within the raw speech 406. In a further example, the phonetic detector 410 identifies the individual phoneme with a phoneme number that indicates a type of the individual phoneme.

The speech coder 412 in one example receives raw speech and employs a speech coding algorithm to output coded speech 420 that corresponds to the raw speech. The phonetic detector 410 and the speech coder 412 receive the raw speech 406. In one example, the duplication component 416 receives and duplicates the raw speech 406, then provides a first copy 422 to the phonetic detector 410 and a second copy 424 to the speech coder. This allows the phonetic detector 410 and speech coder 412 to operate in parallel, as will be appreciated by those skilled in the art. In another example, the phonetic detector 410 operates on the raw speech 406, outputs the phonetic marks 418 to the synchronization component 414, and outputs the raw speech 406 to the speech coder 412. In yet another example, the coder module 402 stores the raw speech 406 in a circular buffer, for example, a shared memory area where both the phonetic detector 410 and the speech coder 412 may retrieve it.

The synchronization component 414 receives the phonetic marks 418 from the phonetic detector 410 and receives the coded speech 420 from the speech coder 412. The synchronization component 414 in one example synchronizes the phonetic marks 418 with the coded speech 420. The synchronization component 414 provides an output 408, for example, an output stream, that comprises the synchronized phonetic marks 418 and coded speech 420. The phonetic marks 418 in one example indicate a start and end of a phoneme within the raw speech 406. The synchronization component 414 in one example preserves this relationship such that the phonetic marks 418 indicate a start and end of the phoneme within the coded speech 420, as will be appreciated by those skilled in the art.

The packet module 404 receives the output 408 from the code module 402. The packet module 404 in one example forms the output 408 into packet stream 422 for transmission over the transmission medium 16. Each packet of the packet stream 422 in one example comprises a packet sequence number and a portion of the output 408, as will be appreciated by those skilled in the art. The packet module 404 in one example forms the packets of the packet stream 422 based on the phonetic marks 418. For example, the packet module 404 may attempt to form a packet such that a phoneme does not span multiple packets.

Figure 5:
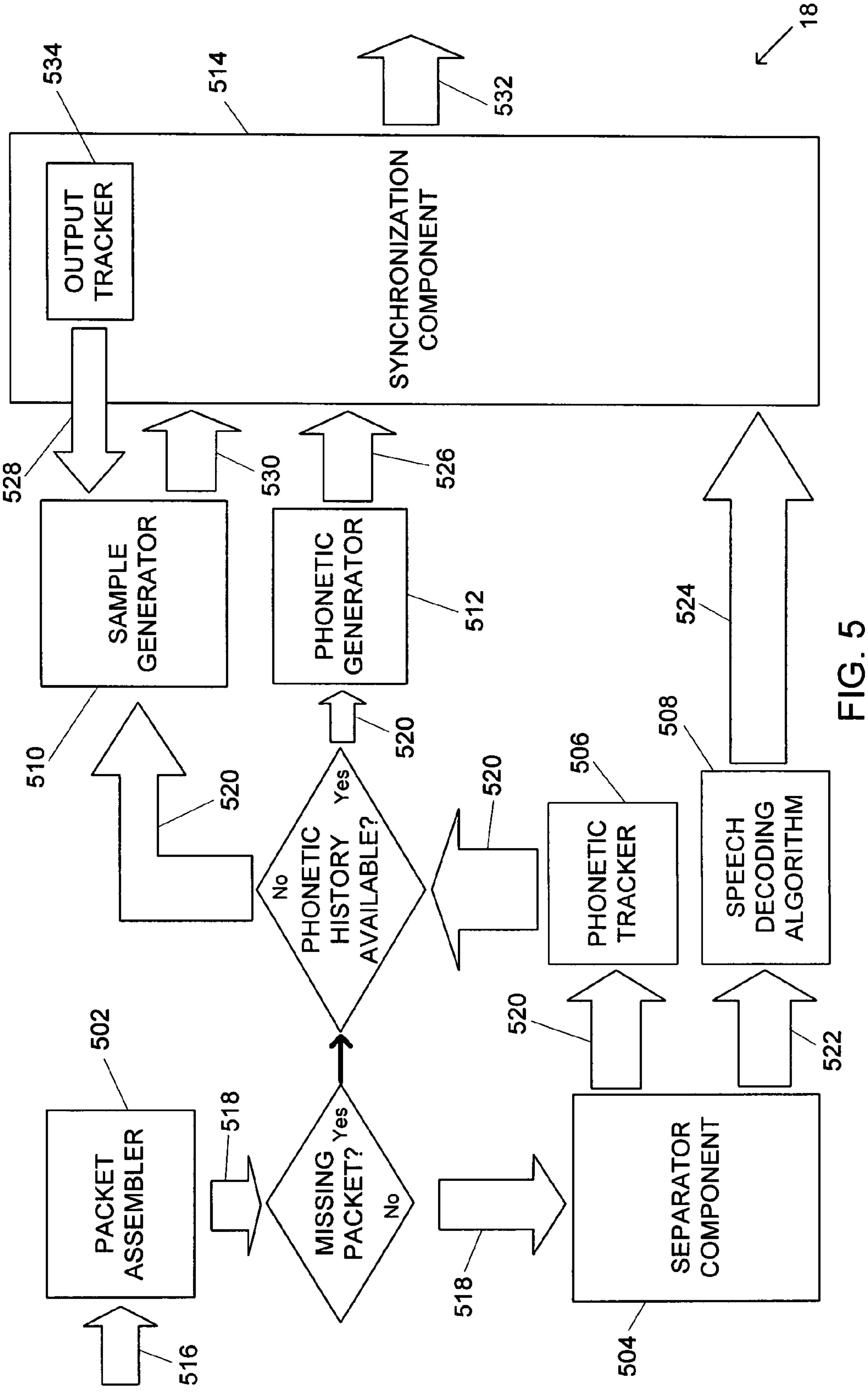
FIG. 5 illustrates a representation of another implementation of the decoder of the apparatus of FIG. 1.

Turning to FIG. 5, another implementation of the decoder 18 is shown. The decoder 18 in this implementation comprises a packet assembler 502, a separator component 504, a phonetic tracker 506, a speech decoding algorithm 508, a sample generator 510, a phonetic generator 512, and a synchronization component 514. The packet assembler 502 receives a packet stream 516 from the transmission medium 16. If there is no packet loss in the transmission medium 16, packet stream 516 is the same as packet stream 422, as will be appreciated by those skilled in the art.

The packet assembler 502 sorts the packets in the packet stream 516 into a proper order and outputs a packet stream 518 to the separator component 504. The proper order in one example is indicated by a sequence number within each packet, for example, a chronological order. The decoder 18 in one example determines if the packet stream 518 is missing any packets through employment of the sequence number. In another example, the packet assembler 502 inserts a new packet into the packet stream 518, for example, a special frame, to fill in any gaps in the packet stream 516. In this example, the decoder 18 may recognize the special frame to determine that a packet was missing from the packet stream 516, as will be appreciated by those skilled in the art.

The separator component 504 separates phonetic marks 520 from coded speech 522 within the packet stream 518. The phonetic marks 520 and coded speech 522 in one example correspond to phonetic marks 418 and coded speech 420, respectively. The phonetic tracker 506 receive the phonetic marks 520 from the separator component 504. In one example, the phonetic tracker 506 stores the phonetic marks 520 in a circular buffer (not shown). The speech decoding algorithm 508 receives the coded speech 522 from the separator component 504. The speech decoding algorithm 508 decodes the coded speech 522 and outputs a raw speech stream 524 to the synchronization component 514.

If the decoder 18 determines that no packets are currently missing from the packet stream 518, the speech decoding algorithm 508 outputs the raw speech stream 524 to the synchronization component 514. If one or more packets are missing from the packet stream 518, the speech decoding algorithm 508 will be unable to properly decode the coded speech 522. For example, there will be a gap in the coded speech 522 and a corresponding gap in the raw speech stream 524. If the decoder 502 determines that one or more packets are missing from the packet stream 518, for example, a gap exists in the packet stream 518, the decoder 502 attempts to fill in the gap through employment of the sample generator 510 and the phonetic generator 512.

The decoder 18 determines if a history of the phonetic marks 520 is available from the phonetic tracker 506, for example, from the circular buffer. If a sufficient number of phonetic marks 520 are available, the phonetic generator 512 processes the phonetic marks 520 and outputs a corresponding raw speech stream 526 to the synchronization component 514. If a sufficient history of the phonetic marks 520 is not available for the phonetic generator 512, the sample generator 510 processes one or more of the available phonetic marks 520 and a tracked raw speech stream 528 to output a raw speech stream 530 to the synchronization component 514. The raw speech streams 526 and 530 in one example comprise synthesized output, as will be appreciated by those skilled in the art. The raw speech stream 526 in one example comprises synthesized phonemes based on the phonetic marks 520. For example, the phonetic generator 512 may estimate a likely audio signal from the original raw speech based on the phonetic marks 520. The raw speech stream 530 in one example comprises synthesized speech, white noise, and/or silence based on the previous raw speech output and/or the phonetic marks 520.

The synchronization component 514 receives the raw speech streams 524, 526, and 530 from the speech decoding algorithm 508, the phonetic generator 512, and the sample generator 510, respectively. The synchronization component 514 in one example interleaves the raw speech streams 524, 526, and 530 to form a raw speech stream 532. The raw speech stream 532 in one example comprises a continuous stream without any gaps. For example, where a gap exists in the raw speech stream 524, the gap is filled by the raw speech stream 526 or 530, as will be appreciated by those skilled in the art.

The synchronization component 514 comprises an output tracker 534 that maintains a history of the raw speech stream 532, for example, a speech output queue. The output tracker 534 provides the history of the raw speech stream 532 to the sample generator 510 as the tracked raw speech stream 528. In one example, the output tracker 534 comprises a circular buffer to store the raw speech stream 524.

Although examples of implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

I claim:

1. A method of transmitting digital voice information comprising the steps of:

encoding speech into encoded digital speech data;

marking the beginning and end of individual phonemes within the encoded digital speech data;

forming the encoded digital speech data into packets; and transmitting the packets to a speech decoding mechanism.

2. The method in accordance with claim 1, wherein the step of forming the encoded digital speech data into packets comprises forming the encoded digital speech data into packets such that no phoneme spans multiple packets.

3. The method in accordance with claim 1, wherein the step of marking the beginning and end of individual phonemes within the encoded digital speech data comprises identifying individual phonemes using a phonetic speech recognition engine.

4. The method in accordance with claim 1, further comprising the step of substituting alternative audio signals for lost packets.

5. The method in accordance with claim 4, wherein the step of substituting alternative audio signals for lost packets comprises substituting silence for lost packets.

6. The method in accordance with claim 4, wherein the step of substituting alternative audio signals for lost packets comprises substituting white noise for lost packets.

7. The method in accordance with claim 4, wherein the step of substituting alternative audio signals for lost packets comprises the following:

providing an intelligent decoder capable of interpreting speech data and generating a likely audio signal for replacing lost packets;

feeding the encoded speech data into an intelligent decoder; and substituting a likely audio signal for lost packets via the intelligent decoder.

8. A method of manipulating digital voice information comprising the steps of:

inputting raw speech into a phonetic detector;

actuating the phonetic detector to mark predetermined units of speech within the raw speech wherein actuating the phonetic detector to mark predetermined units of speech comprises marking the beginning and end of individual phonemes within the raw speech;

encoding the raw speech into encoded digital speech data while retaining the marked predetermined units of speech; and forming the encoded digital speech data into packets.

9. The method in accordance with claim 8, further comprising the step of transmitting the packets to a speech decoding mechanism.

10. The method in accordance with claim 9, further comprising the steps of:

receiving the packets at a speech decoding mechanism; and reassembling the packets into a predetermined sequence.

11. The method in accordance with claim 10, further comprising the step of detecting missing packets in the predetermined sequence.

12. The method in accordance with claim 11, further comprising the steps of:

providing an intelligent decoder capable of interpreting speech data and generating a likely audio signal for replacing lost packets;

feeding the reassembled packets into the intelligent decoder;

substituting a likely audio signal for lost packets via the intelligent decoder; and feeding the reassembled packets and substituted audio signals into a speech generator.

13. The method in accordance with claim 11, further comprising the steps of:

substituting silence for lost packets and feeding the reassembled packets and substituted silence into a speech generator.

14. The method in accordance with claim 11, further comprising the steps of:

substituting white noise for lost packets; and feeding the reassembled packets and substituted white noise into a speech generator.

15. The method in accordance with claim 11, wherein the step of substituting an alternative audio signal comprises the following:

providing an intelligent decoder capable of interpreting speech data and generating a likely audio signal for replacing missing packets;

feeding the reassembled packets into the intelligent decoder; and substituting a likely audio signal for lost packets via the intelligent decoder.

16. The method in accordance with claim 11, wherein the step of substituting an alternative audio signal comprises substituting silence for missing packets.

17. The method in accordance with claim 11, wherein the step of substituting an alternative audio signal comprises substituting white noise for lost packets.

18. The method in accordance with claim 8, wherein the step of marking the beginning and end of individual phonemes within the raw speech comprises identifying individual phonemes using a phonetic speech recognition engine.

19. A method of transmitting digital voice information comprising the steps of:

inputting raw speech into a phonetic detector;

actuating the phonetic detector to mark individual phonemes within the raw speech;

encoding the raw speech into encoded digital speech data while retaining the marked phonemes;

forming the encoded digital speech data into packets;

transmitting the packets to a speech decoding mechanism;

reassembling the packets at the speech decoding mechanism;

detecting missing packets;

substituting an alternative audio signal for any missing packets; and sending the reassembled packets and substituted audio signals into a speech generator; and generating raw speech output at the speech generator.

20. A system for transmitting digital voice information comprising:

a speech encoder adapted and constructed to encode speech into encoded digital speech data;

a phonetic marker adapted and constructed to mark the beginning and end of individual phonemes within encoded digital speech data from the speech encoder;

a speech coder adapted and constructed to form the encoded digital speech data from the phonetic marker into packets; and a transmission medium for transmitting the packets to a speech decoding mechanism.

* * * * *